Aug. 25, 1936.　　　A. W. DAINOS　　　2,052,451
MOTOR VEHICLE SERVICING APPARATUS
Filed July 9, 1934　　　2 Sheets-Sheet 1
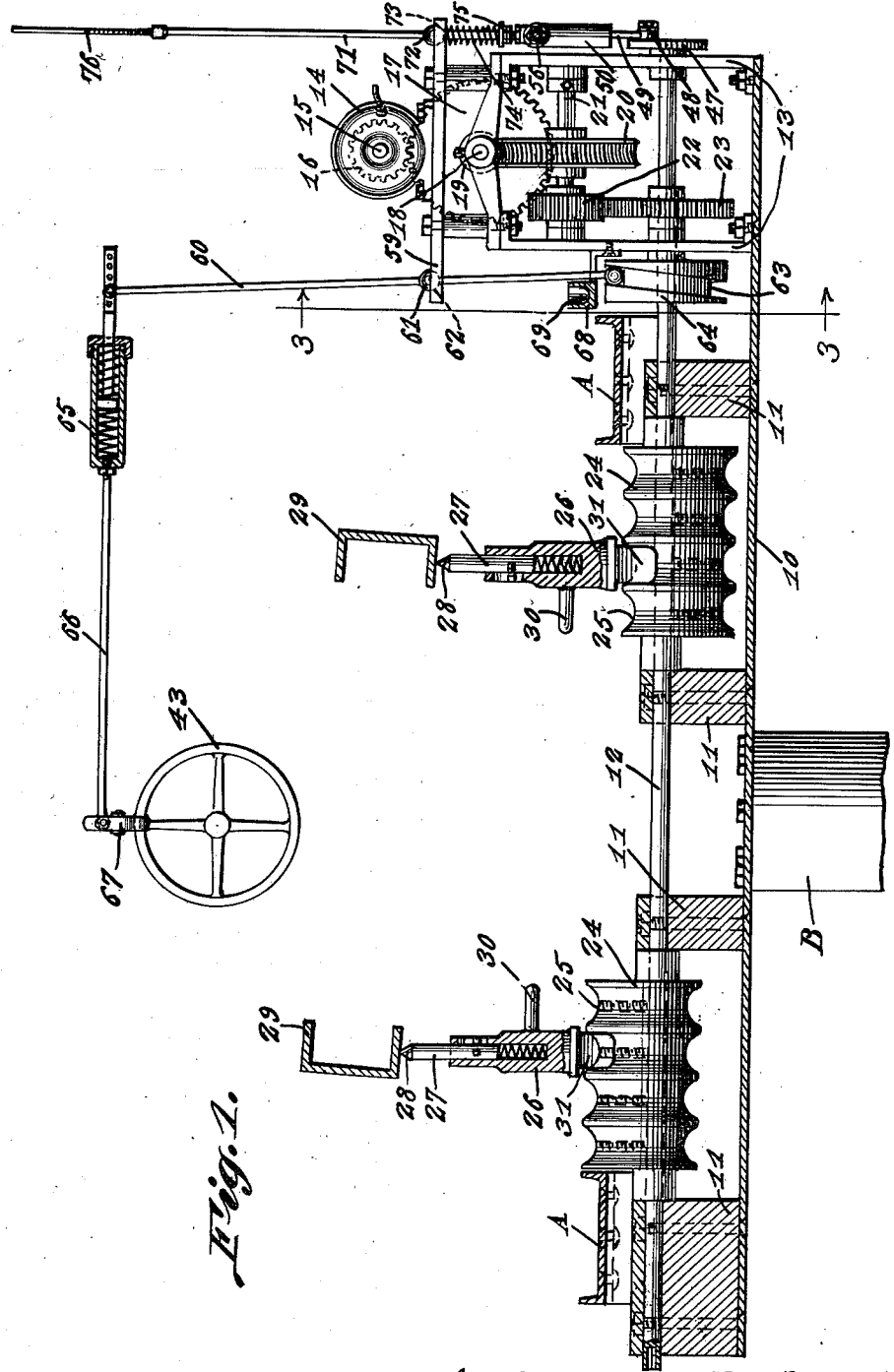
Anthony W. Dainos, INVENTOR
BY Victor J. Evans & Co.
ATTORNEY Aug. 25, 1936.  A. W. DAINOS  2,052,451
MOTOR VEHICLE SERVICING APPARATUS
Filed July 9, 1934   2 Sheets-Sheet 2
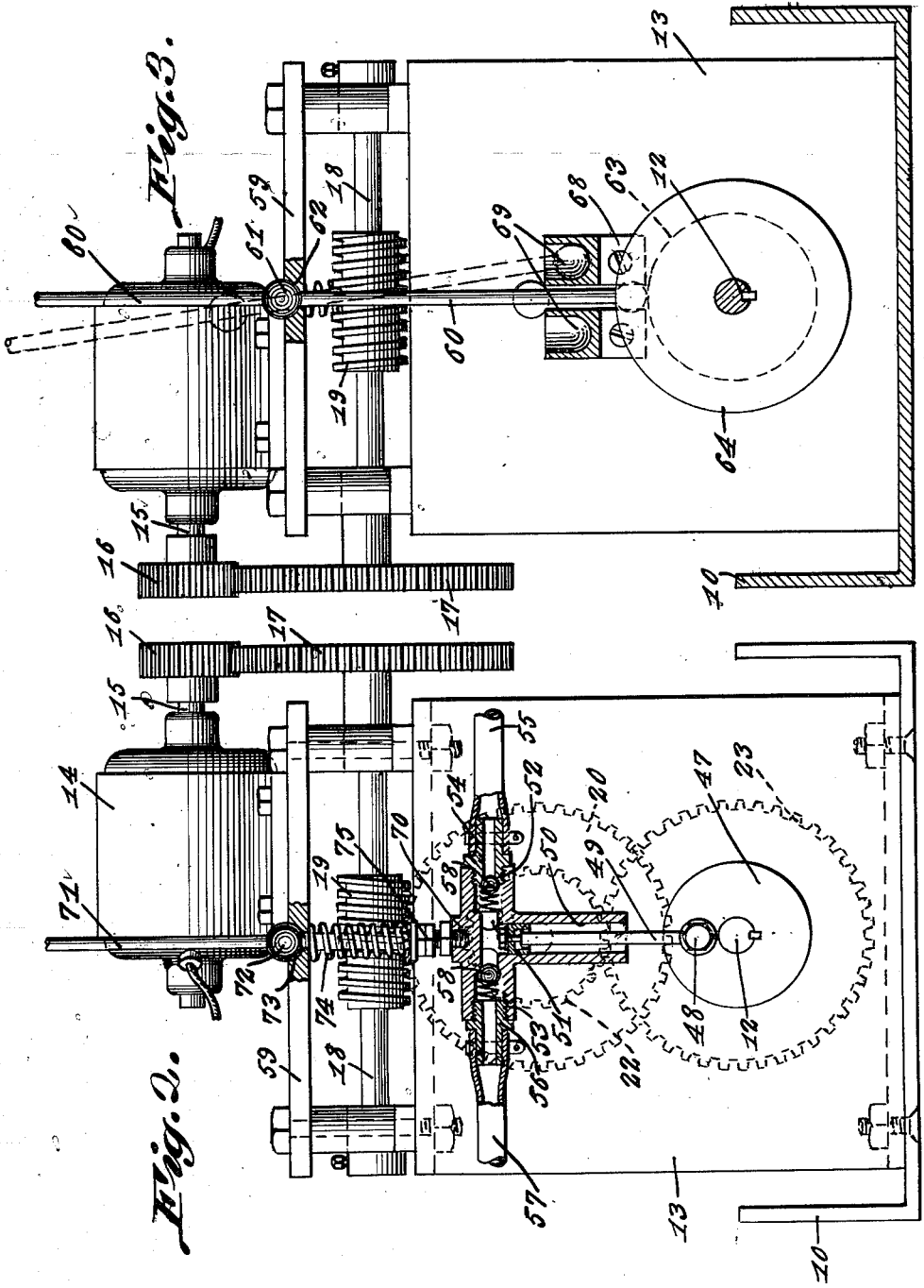
Anthony W. Dainos, INVENTOR
BY Victor J. Evans & Co.
ATTORNEY Patented Aug. 25, 1936

2,052,451

UNITED STATES PATENT OFFICE 2,052,451

MOTOR VEHICLE SERVICING APPARATUS

Anthony W. Dainos, New Orleans, La.

Application July 9, 1934, Serial No. 734,381

2 Claims. (Cl. 184—1)

The invention relates to motor vehicle servicing apparatus and more especially to refinements or improvements in the subject matter of United States Letters Patent #1,808,596, issued June 2, 1931.

The primary object of the invention is the provision of an apparatus of this character, wherein through the use of a floating system for a motor vehicle, the same can be serviced for oiling, greasing, tightening and adjusting parts of the same and in the oiling and greasing a thorough and proper lubrication may be had, particularly the springs, as by a raising and rocking motion of the vehicle the leaves of such springs will be opened to permit the delivery of lubricant therebetween and in this fashion eliminating squeaks and noises commonly present in motor vehicles and also avoiding frozen shackles or other parts for such vehicle for the want of lubrication.

Another object of the invention is the provision of an apparatus of this character, wherein the same involves refinements or improvements over the subject matter of Letters Patent #1,808,596, bearing issue date of June 2, 1931, the apparatus being novel and assuring a thorough servicing of motor vehicles without excessive labor and with dispatch.

A still further object of the invention is the provision of an apparatus of this character, wherein the construction thereof permits its adaptation to motor vehicle racks as commonly employed in service stations and garages and will enable a full and complete servicing of such vehicle when in the rack, the apparatus being comparatively simple in construction, thoroughly reliable and effective in its purposes, automatic in its operation, convenient for detecting defects, improperly functioning parts, greasing and lubrication of motor vehicle, as well as being strong, durable, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is a vertical transverse sectional view through a motor vehicle lift rack showing the apparatus constructed in accordance with the invention in association therewith.

Figure 2 is an end elevation partly in section.

Figure 3 is a sectional view on the line 3—3 of Figure 1 looking in the direction of the arrows.

Similar reference characters indicate corresponding parts throughout the several views in the drawings.

Referring to the drawings in detail, A designates portions of channeled sills forming runways of the hydraulic lift employed at service stations for the hoisting of motor vehicles and of standard construction. Disposed upon the lifting cylinder or jack B of the lift and disposed transversely with respect to the sills A of the latter is a support 10. This support may be arranged in a greasing pit or at a service station, garage or the like if desired, or it may be otherwise located. Upon the support 10 are suitable bearings 11 in which is journaled a driven shaft 12 which extends into frame 13 of a stand mounted upon and rising from the support 10 at one end thereof. This stand is of the required make-up and carries an electric motor 14 constituting the power source for the apparatus and its driving shaft 15 carries a gear 16 meshing with a gear 17, its shaft 18 being suitably journaled in the stand and carrying a worm screw 19. The worm screw 19 is in mesh with the worm gear 20 upon a shaft 21 which is also journaled in said stand. The shaft 21 carries a pinion 22 meshing with a gear 23 on the shaft 12, so that the latter is driven from the motor 14, as should be apparent.

Upon the shaft 12 between the runways A are fixed a series of peripherally grooved eccentric rollers or wheels 24, such series being arranged at opposite sides of the longitudinal center of the lift and the said shaft 12 is preferably located medially with respect to the length of the lift. Adapted to be changeably engaged with the series of rollers or wheels 24 in the peripheral grooves 25 thereof are jacks 26 having spring pressed bearing posts 27 provided with the pointed tips 28 for biting engagement with the side sills 29 of a motor vehicle, these tips being adapted to effect a hold-fast engagement with the said sills, and the jacks 26 carry handholds or grips 30, so that they can be conveniently placed and handled. Each jack 26 carries a saddle base 31 for fitting in straddling relation the rollers or wheels 24, the selective engagement of the jacks 26 being at the option of the user thereof and for the purpose of accommodating such jacks to the motor vehicle chassis according to the size of the vehicle. These jacks under the action of the series of rollers or wheels 24, one series being set reversely to the other series in their fixed relation upon the shaft 12, will alternately raise and lower the chassis of the motor vehicle for imparting a rocking motion thereto and the purpose for so doing is to enable full and complete lubrication of the leaves of the springs of such vehicle, as under the rocking motion the leaves will open so that lubricant or grease may be delivered therebetween, and in this manner these springs can be quickly and effectively lubricated.

It is understood, of course, that the motor vehicle is directed onto the rack or lift, its wheels following the channeled runways A of such lift, as is common. The bearing posts 27 at their tips 28 will assure positive engagement of the jacks 26 with the side sills 29 of the chassis of the motor vehicle and on the rocking and lifting of such vehicle there is no liability of the slipping of the chassis or the jack to avoid freeing of the latter while being operated upon by the series of wheels or rollers 24 which have a cam action upon the jacks in the working of the apparatus.

Carried at one end of the shaft 12 is a disk 47 having the eccentric wrist pin 48 with which is connected a piston rod 49, its piston operating within a pump cylinder 50 for lubricant, the piston being indicated at 51, and said cylinder having the inlet and outlet branches 52 and 53, respectively, at opposite sides thereof. The inlet branch 52, through the medium of the coupling nipple 54, has connection with a lubricant supply conduit or lead 55. The branch 53, through the coupling nipple 56, has connection with an outlet or delivery pipe 57 for lubricating service in the lubrication of the equipment of the motor vehicle when the apparatus is in use.

The branches 52 and 53 have arranged therein spring controlled return check valves 58, these being of standard kind. It is, of course, understood that the lubricant supply lead or conduit 55 has fitted therewith a suitable cut-off valve (not shown) to regulate or shut off the feed of lubricant to the pump and likewise the electric circuit to the motor 14 includes a suitable switch (not shown) for starting and stopping said motor.

On the frame 13 of the stand is a table top 59 and passed through a suitable opening therein is a rocking lever 60, having a ball bearing 61 removable within a seat 62 therefor within the top 59. The lower end of the lever 60 engages in a cam groove 63 in a cam wheel 64 fixed to the shaft 12, while the upper end of the lever has connection with a spring equalizer 65 which, through the rod 66 and clip 67 carried thereby, is adapted for attachment to the steering wheel 43 of the motor vehicle and the purpose therefor is to give a turning motion to the steering mechanism, whereby tight or loose parts in its equipment can be detected, adjustments made and a complete and thorough lubrication attained.

Upon the frame 13 of the stand are brackets 68, these being located on opposite sides of the path of movement of the lever 60 and carrying cupped rests 69 for accommodating the lower end of the lever 60 on its disengagement from the cam wheel 64, this being effected by manually lifting the lever which extracts its ball bearing 61 from its seat 62 and the placing of the lower end of this lever in either of the rests 69 and thus rendering said lever passive or inactive and also permitting the disconnection of the clip 67 from the wheel 43 or for the initial attachment of the clip with said wheel.

The cylinder 50 for lubricant has threaded in its head 70 the lower end of a swinging rod 71 which carries a bearing ball 72 fitted within a seat 73 in the top 59 of the stand. The rod has sufficient play in the top of the frame so that it is reciprocable. The rod 71 extends above the top 59 and active against the under side of this tip is a coiled compression spring 74 which functions to normally hold the ball seated. The compression spring 74 at its lower end is engaged upon an abutment 75 in the form of adjustable jam nuts on said rod and the other end of the spring plays against the under face of the top 59.

When the disk 47 is rotated the piston is operated in an outward direction to cause a suction stroke with lubricant entering the cylinder past check value 58 on the right, (Figure 2) the cylinder 50 pivoting about the ball 72 during such stroke. When the piston starts on its inward or discharge stroke beginning 180 degrees from the position in Figure 2 the inlet valve 58 on the right is closed and if the outlet from the conduit 57 is open the lubricant will be forced therethrough past check valve 58 on the left.

In the event that the outlet from conduit 57 is closed the piston and its cylinder will move in unison (the grease being incompressible) the rod 71 being forced upwardly through the seat 73, thereby compressing the spring 74. On the downward stroke, if conduit 57 is still closed, the spring returns the cylinder and piston in unison without drawing any lubricant through the lead 55. This latter operation continues without drawing in or discharging any lubricant during continued rotation of the disk 47, until the outlet is opened to allow discharge from the cylinder.

The apparatus in the use thereof enables movement to be imparted to a motor vehicle similar to those when the vehicle is in motion upon a road and therefrom there can be readily detected any defects in the parts of the working of the vehicle, such as looseness, tightness or irregularity in fittings of the equipment of the vehicle, anl also a proper, full and complete lubrication may be had to all moving surfaces and contacting parts of such equipment. The apparatus undoubtedly materially aids a mechanic in the lubrication of the motor vehicle, as such apparatus delivers lubricant, whether oil or grease, and in its working assures full and complete lubrication with dispatch.

The lubricant pump will distribute oil or grease to the parts in the working of the apparatus and this should be obvious, the pipe 57 being utilized for this purpose.

The apparatus is adaptable for small or large jobs and in no wise is detrimental or abusive to any parts of the motor vehicle or its equipment, with a resultant thorough servicing thereof.

What is claimed is:

1. In an apparatus of the kind described, a frame, a motor supported by said frame, a disk driven by said motor, a piston having a rod eccentrically pivoted to the disk, a pumping cylinder reciprocatingly accommodating said piston, conduit means through which lubricant is supplied to said cylinder, a second conduit means through which lubricant is discharged from said cylinder, check valves for controlling said means, a rod connected with the cylinder and extending through an opening in the frame for reciprocation in said opening and having a bearing ball seated in the top of the frame, and a coiled compression spring about said rod and normally holding the ball seated.

2. In an apparatus of the kind described, a frame, a motor supported by said frame, a disk driven by said motor, a piston having a rod eccentrically pivoted to the disk, a pumping cylinder reciprocatingly accommodating said piston, conduit means through which lubricant is supplied to said cylinder, a second conduit means through which lubricant is discharged from said cylinder, check valves for controlling said means, a rod connected with the cylinder and extending through an opening in the frame for reciprocation in said opening and having a bearing ball seated in the top of the frame, a coiled compression spring about said rod and normally holding the ball seated, and jam nuts on the rod and working against the spring to vary the compression thereof.

ANTHONY W. DAINOS.